US012561471B2

(12) United States Patent
Du et al.

(10) Patent No.: US 12,561,471 B2
(45) Date of Patent: Feb. 24, 2026

(54) METHOD AND SYSTEM FOR DATA COMMUNICATION WITH DIFFERENTIALLY PRIVATE SET INTERSECTION

(71) Applicant: Alipay (Hangzhou) Information Technology Co., Ltd., Zhejiang (CN)

(72) Inventors: Jian Du, Zhejiang (CN); Pu Duan, Zhejiang (CN); Benyu Zhang, Zhejiang (CN); Yang Yang, Zhejiang (CN); Qunshan Huang, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 97 days.

(21) Appl. No.: 18/391,505

(22) Filed: Dec. 20, 2023

(65) Prior Publication Data

US 2024/0135024 A1 Apr. 25, 2024

Related U.S. Application Data

(63) Continuation of application No. PCT/CN2021/104358, filed on Jul. 2, 2021.

(51) Int. Cl.
 *G06F 21/62* (2013.01)
 *G06F 7/58* (2006.01)
(52) U.S. Cl.
 CPC .......... *G06F 21/6227* (2013.01); *G06F 7/588* (2013.01)
(58) Field of Classification Search
 USPC ........................................................ 726/26
 See application file for complete search history.

(56) References Cited

U.S. PATENT DOCUMENTS

| | | | | |
|---|---|---|---|---|
| 10,977,384 | B2 * | 4/2021 | Benaloh .............. | G06F 21/6245 |
| 2018/0349620 | A1 | 12/2018 | Bhowmick et al. | |
| 2019/0227980 | A1 | 7/2019 | McMahan et al. | |
| 2019/0386814 | A1 * | 12/2019 | Ahmed ................... | H04L 9/008 |
| 2021/0073291 | A1 * | 3/2021 | Hunter ................... | G06N 3/045 |
| 2021/0089679 | A1 * | 3/2021 | Burckard ............ | G06F 21/6245 |
| 2022/0138348 | A1 * | 5/2022 | Bernau ................... | G06N 3/09 |
| | | | | 726/26 |
| 2022/0237437 | A1 * | 7/2022 | Al-Marzouqi ......... | G06N 3/047 |

FOREIGN PATENT DOCUMENTS

| | | | | | |
|---|---|---|---|---|---|
| CN | 105205406 | A | 12/2015 | | |
| CN | 107222851 | A | 9/2017 | | |
| CN | 111506924 | A * | 8/2020 | ......... | G06F 21/6245 |
| CN | 112910631 | A | 6/2021 | | |

* cited by examiner

*Primary Examiner* — Sanchit K Sarker
(74) *Attorney, Agent, or Firm* — Seed IP Law Group LLP

(57) ABSTRACT

Methods, systems, and apparatuses, including computer programs encoded on computer storage media, for data communication with differentially private intersection dataset. On example method includes: determining a plurality of bias parameters based on a parameter for establishing a differential privacy (DP) data protection; determining an intersection dataset based on client data from a client device and server data from the server device; updating the intersection dataset based on the client data and the plurality of bias parameters; and returning the updated intersection data having the DP data protection to the client device.

20 Claims, 4 Drawing Sheets

120 Server

122 Server Data

135 Client Data

125 Intersection dataset with DP

135 Client data

130 Clients

220 Server

206 Determine bias parameters

207 Retrieve server data

208 Determine intersection dataset

209 Update the intersection dataset based on the bias parameters

210 Return a DP protected intersection dataset

200 Client

202 Send client data

204 Data analysis on intersection dataset

400

Require: Sever input:$\mathcal{C}$, $\mathcal{S}$ and computes $\mathcal{I}$. Server output: $\mathcal{I}_{DP}$

```
1: for each element c_i in C do
2:     if c_i ∈ I then
3:         coin ←^{p_{11}} {0,1}    // Flip a biased coin with bias p*_11 for head.
4:         if coin = head then
5:             c_i ∈ I_DP
6:         end if
7:     end if
8:     if c_i ∉ I then
9:         coin ←^{p_{01}} {0,1}    // Flip a biased coin with bias p*_01 for head.
10:        if coin = head then
11:            c_i ∈ I_DP
12:        end if
13:    end if
14: end for
```

500

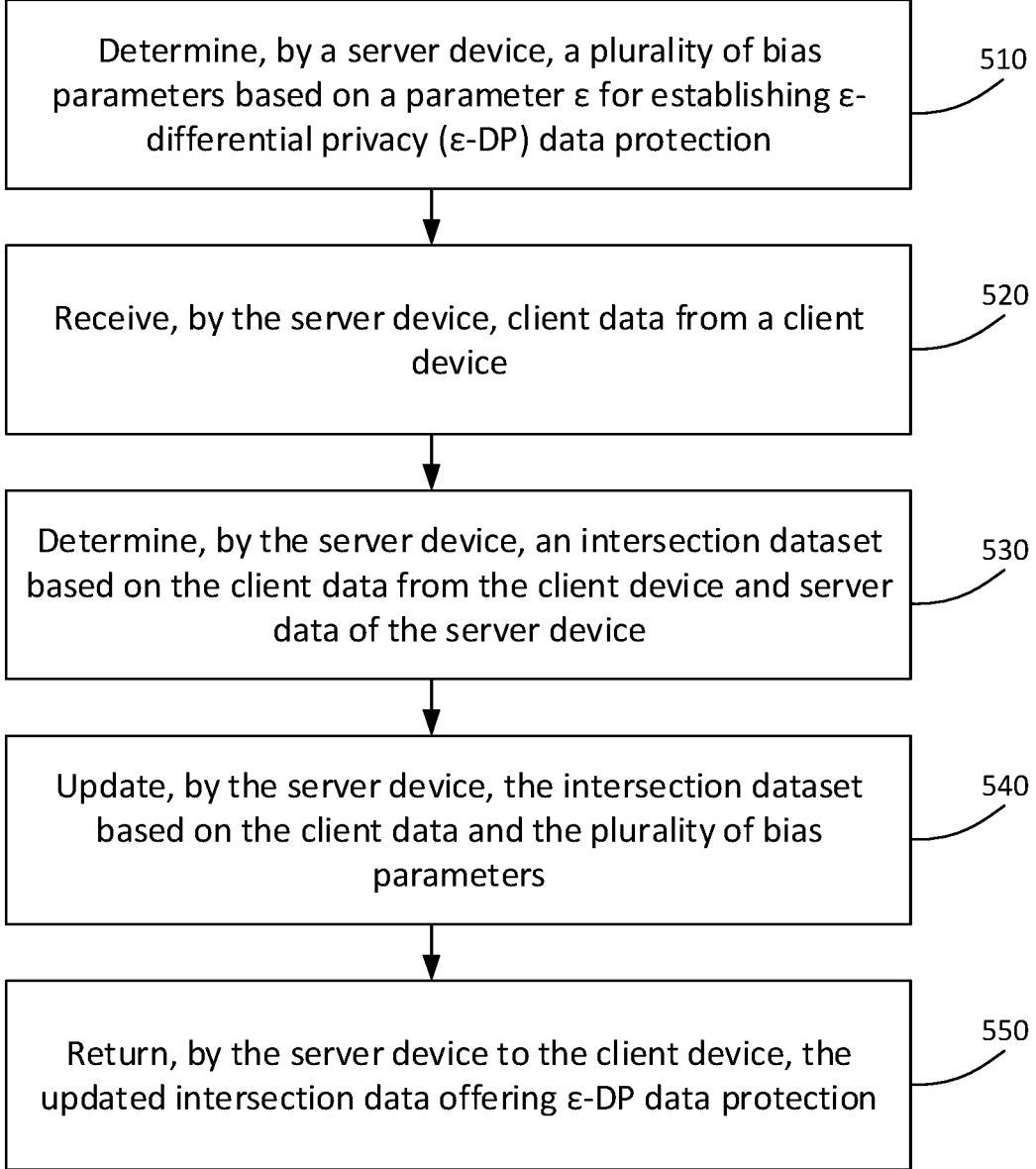

Determine, by a server device, a plurality of bias parameters based on a parameter $\varepsilon$ for establishing $\varepsilon$-differential privacy ($\varepsilon$-DP) data protection    510

Receive, by the server device, client data from a client device    520

Determine, by the server device, an intersection dataset based on the client data from the client device and server data of the server device    530

Update, by the server device, the intersection dataset based on the client data and the plurality of bias parameters    540

Return, by the server device to the client device, the updated intersection data offering $\varepsilon$-DP data protection    550

Internet

METHOD AND SYSTEM FOR DATA COMMUNICATION WITH DIFFERENTIALLY PRIVATE SET INTERSECTION

TECHNICAL FIELD

The disclosure generally relates to systems and methods for providing data privacy, specifically, for data communication with differentially private set intersection (PSI) in client-server models.

BACKGROUND

Differential privacy (DP) in data science is a mechanism for publicly sharing data about a dataset by describing the patterns of groups within the dataset while withholding information about individual data entry in the dataset. Private set intersection (PSI), i.e., a sub-field of DP, allows two parties to compute the intersection of their data without revealing the data they possess that is outside of the intersection. For example, an e-commerce platform and a partner institution may share the intersection of their respective user data to determine advertisement conversion rates. The intersection may include historical data of users owned/served by both the e-commerce platform and the partner institution. In some cases, these shared user data may be deemed as non-sensitive, and the user data owned by only one of the two parties is deemed as sensitive (i.e., cannot be shared).

However, in many cases of joint data analysis, the intersection of data may also be sensitive and should be protected by DP. Using the same example described above, one may argue that the user data, even shared by both parties, may include personally identifiable information (PII), which is sensitive and should have privacy protection. In addition, if the user data in the intersection is not DP protected, a malicious user may try adaptive attacks using auxiliary information to derive the user data. On the other hand, protecting the intersection with DP may lower data precision (i.e., a number of correct results returned) and recall (i.e., the number of correct results divided by an expected number of results). Therefore, determining a differentially private set intersection in data communication while striking a balance between the DP and the data precision and recall is an intriguing and challenging problem.

SUMMARY

Various implementations of the present specification may include systems, methods, and non-transitory computer-readable media for data communication with differentially private set intersection.

According to one aspect, a method for data communication may include: determining, by a server device, a plurality of bias parameters based on a parameter $\varepsilon$ for establishing $\varepsilon$-differential privacy ($\varepsilon$-DP) data protection; receiving, by the server device, client data from a client device; determining, by the server device, an intersection dataset based on the client data from the client device and server data of the server device; updating, by the server device, the intersection dataset based on the client data and the plurality of bias parameters; and returning, by the server device to the client device, the updated intersection data offering $\varepsilon$-DP data protection.

In some implementations, the determining the plurality of bias parameters based on the parameter $\varepsilon$ comprises: determining a first bias parameter based on the parameter $\varepsilon$; and determining a second bias parameter as a complement of the first bias parameter.

In some implementations, the plurality of bias parameters comprises a first bias parameter, and the updating the intersection dataset based on the client data and the plurality of bias parameters comprises: iterating each data entry in the client data; determining whether the data entry is in the intersection dataset; if the data entry is in the intersection dataset, removing, with a probability determined based on the first bias parameter, the data entry from the intersection dataset.

In some implementations, the removing the data entry from the intersection dataset with a probability determined based on the first bias parameter comprises: constructing a random number generator that yields a first value with a first probability equal to the first bias parameter and a second value with a complement probability of the first probability; executing the random number generator to obtain an output; if the output is the first value, removing the data entry from the intersection dataset; and if the output is the second value, leaving the data entry in the intersection dataset.

In some implementations, the plurality of bias parameters further comprise a second bias parameter that is a complement of the first bias parameter, and if the data entry is not in the intersection dataset, adding, with a probability determined based on the second bias parameter, the data entry into the intersection dataset.

In some implementations, the adding the data entry into the intersection dataset based on a probability determined based on the first bias parameter comprises: constructing a random number generator that yields a first value with a first probability equal to the second bias parameter and a second value with a complement probability of the first probability; executing the random number generator to obtain an output; if the output is the first value, adding the data entry into the intersection dataset; and if the output is the second value, removing the data entry from the intersection dataset.

In some implementations, the determining the first bias parameter based on the parameter $\varepsilon$ comprises determining the first bias parameter based on the parameter $\varepsilon$ and Euler's number e.

In some implementations, the parameter $\varepsilon$ is a positive real number.

In some implementations, the client data and the server data are homomorphically encrypted.

In some implementations, the server device is associated with an e-commerce platform, and the client device provides online advertisement services.

According to another aspect, a computer system of a server device for data communication is described. The computer system may include one or more processors and one or more non-transitory computer-readable memories coupled to the one or more processors and configured with instructions executable by the one or more processors to cause the system to perform operations including: determining a plurality of bias parameters based on a parameter $\varepsilon$ for establishing $\varepsilon$-differential privacy ($\varepsilon$-DP) data protection; receiving client data from a client device; determining an intersection dataset based on the client data from the client device and server data of the server device; updating the intersection dataset based on the client data and the plurality of bias parameters; and returning, to the client device, the updated intersection data offering $\varepsilon$-DP data protection.

According to yet another aspect, a non-transitory computer-readable storage medium of a server device for data communication is described. The non-transitory computer-readable storage medium is configured with instructions executable by one or more processors to cause the one or more processors to perform operations including: determining a plurality of bias parameters based on a parameter ε for establishing ε-differential privacy (ε-DP) data protection; receiving client data from a client device; determining an intersection dataset based on the client data from the client device and server data of the server device; updating the intersection dataset based on the client data and the plurality of bias parameters; and returning, to the client device, the updated intersection data offering ε-DP data protection.

Implementations disclosed in the specification have one or more technical effects. In some implementations, when a client sends client data to a server and requests for the intersection between the client data and server data, the data returned from the server are protected by differential privacy (DP). The DP protection prevents privacy attacks based on auxiliary information. It effectively prevents possible linking attacks on de-identified data. In some implementations, the server may configure its parameters (called bias parameters) to provide the desired/requested DP protection strength. When a client requests the server to return an intersection between the client data and the server data, the server may apply these parameters to introduce noise/perturbation into the intersection to provide the desired DP protection strength while providing optimal precision and recall for the returned result (minimizing the loss of precision and recall). Empirical results show that when the described solution and existing solutions achieve the same desired DP protection strength, the described solution improves precision and recall by nearly 30% over that offered by the existing solutions. In some implementations, the above-mentioned noises may be introduced by one or more of the following operations: 1) if a data entry from the client data is in the intersection, removing the data entry from the intersection dataset based on a probability determined based on a first bias parameter; and 2) if a data entry from the client data is not in the intersection, adding the data entry into the intersection dataset based on a probability determined based on a second bias parameter. In comparison with existing solutions, the described solution herein saves computing resources by iterating the client data once to generate the DP-protected intersection for return. Therefore, the described solution herein improves the performance of computing DP protected set intersection.

These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

FIG. 5 illustrates another example method for data communication with differentially private set intersections in accordance with some implementations.

DETAILED DESCRIPTION

Many practical applications involving data exchange or data sharing face differentially private set intersection problems. For example, a client and a server each own their respective datasets. After receiving the client dataset from the client who requires receiving the data intersection with the server dataset, the server acknowledges the client while protecting its data privacy from leakage via differential privacy (DP). With DP protection, the client cannot tell with certainty whether any data point in the returned intersection result belongs to the server dataset. In general, providing DP protection involves introducing data noises or perturbations into the result, which may sacrifice data precision and recall. This specification discloses an optimal randomized response mechanism for DP protection that can achieve optimal precision and recall while satisfying the required DP protection strength.

Figures 1, 2:
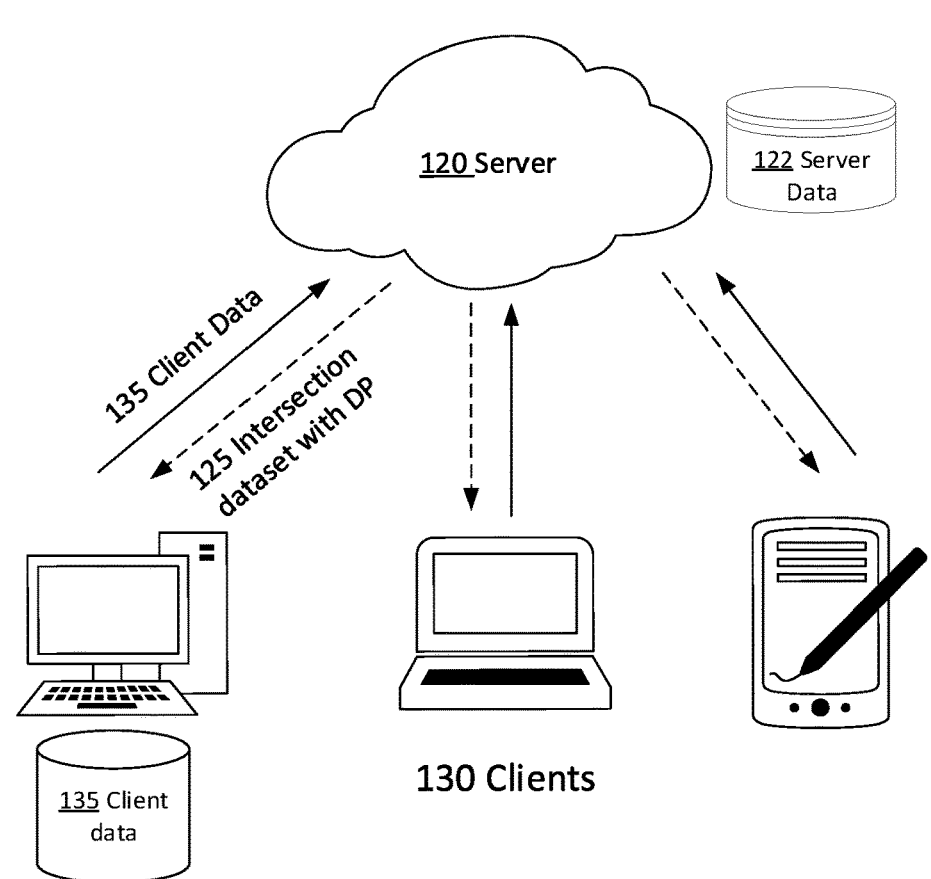
FIG. 1 illustrates an example framework for data communication with differentially private set intersections in accordance with some implementations.
FIG. 2 illustrates an example system diagram for data communication with differentially private set intersections in accordance with some implementations.

FIG. 1 illustrates an example framework for data communication with differentially private set intersections in accordance with some implementations. The example framework involves a server 120 and one or more clients 130, communicating via communication channels between the server 120 and the clients 100. In some implementations, the server 120 may include a computing system or a computing device. It is to be understood that although one server 120 is shown in FIG. 1, any number of computing devices may work collectively and be treated as the server 120. The server 120 may be implemented in one or more networks (e.g., enterprise networks), one or more endpoints, one or more data centers, or one or more clouds. The server 120 may include hardware and/or software which manages access to a centralized resource or service in a network. A cloud may include a cluster of servers and other devices distributed across a network.

In some implementations, the clients 130 may include various types of terminal devices, such as a mobile phone, tablet, server, desktop computer, laptop computer, etc. The server 120 may communicate with the clients 130, and other computing devices. Communication between devices may occur over the internet, through a local network (e.g., LAN), through direct communication (e.g., BLUETOOTH™, radio frequency, infrared), etc.

In some implementations, both the server 120 and the clients 130 may possess data. The server 120 may possess server data 122, and each client 130 may possess client data 135, which may be dynamic and frequently updated. The server data 122 and the client data 130 may have a certain amount of overlapping data (called intersection). In certain cases, the client 130 may send a request to the server 120 requesting the intersection data for data analysis. For example, the client 130 may send the client data 135 to the server 120, and the server 120 may determine the intersection data between the received client data 135 and its own server data 122. In some implementations, in order to provide differential privacy (DP) protection to the data to be returned to the client 130, the server 120 may manipulate the dataset in the intersection to inject DP protection and return the intersection dataset with DP 125 to the client. During this process, the client data 135 may be encrypted to protect the client 130's privacy, or the client data 135 and the server data 122 may be both homomorphically encrypted (e.g., using homomorphic commitment mechanisms) so that the intersection and DP injection operations may be performed on the server 120 without actually knowing the data in plaintext.

The following description uses denotations and models to formally define DP-protected set intersection. Let S denote the server data 122 and C=[c1, c2, . . . ] denote the client data 135. The intersection between the server data 122 and the client data 135 may be computed by the server 120 via $I \triangleq C \cap S$, where I refers to the intersection. Let $x_i$ be an indicator variable, and $x_i = f(c_i)$ represents whether a $c_i \in C$ is in the intersection I. That is, $$x_i = f(c_i) \triangleq \begin{cases} 1, \text{if } c_i \in I \\ 0, \text{if } c_i \in C \backslash I \end{cases} \tag{1}$$

The above formula (1) means if a data entry from the client data 135 is in the intersection I, $x_i$ yields value 1. If the data entry is not in the intersection I ("C\I" means in C but not in I), $x_i$ yields value 0.

Let $I_{DP} \triangleq M(C,S)$ denote the privatized/DP protected views of I, which prevent the client 130 from knowing if any element in $I_{DP}$ belongs to S for sure. A DP protected set intersection may be defined by:

$$P(M(C,S) \in F) \leq e^{\varepsilon} P(M(C,S') \in F) \tag{2},$$

where P refers to probability, $F \in R^{|I_{DP}|}$, S' refers to a dataset similar to the server data S with one different data point, and $\varepsilon$ refers to the quantified strength of DP protection. The above formula (2) may be interpreted as: given a data entry in the client data and a DP protected intersection $I_{DP}$, the probability of the data entry being in $I_{DP}$ is so close to the probability of the data entry not being in $I_{DP}$ that the client cannot determine whether the specific data entry is actually in the intersection. That is, the client cannot determine whether the specific data entry is from the intersection of C and S or the intersection of C and S'. The similarity between the two probabilities may be quantified/controlled by $\varepsilon$, which may also be referred to as the DP protection strength parameter. As shown in formula (2), when $\varepsilon=0$, the DP protection is the strongest.

FIG. 2 illustrates an example system diagram for data communication with differentially private set intersections in accordance with some implementations. The system diagram includes the operations performed by a client 200 (may also be referred to as a second device) and a server 220 (may also be referred to as a first device) and their data communication. The operations in FIG. 2 are for illustrative purposes, which may include more, fewer, or alternative steps depending on the implementation.

In some implementations, the client 200 may perform data analysis on the intersection between its data (referred to herein as "client data" for descriptive purposes) and the data owned by the server (referred to herein as "server data" for descriptive purposes). For instance, the client 200 provides online advertisement services to a plurality of users, and the advertisement link to an e-commerce platform owned by the server 220. The client 200 may want to understand the conversion rate of its advertisement services by collaborating with the server 220. Specifically, the client 200 may want to analyze how many of its advertisement users end up making purchases at the e-commerce platform. This data analysis may require obtaining by the client 200 from the server 220 a set intersection between the client data and the server data. At the same time, the server 220 must protect its data privacy by preventing the client 200 from reverse-engineer or derive the data of any individual user is in the returned intersection.

As shown in FIG. 2, the client 200 may initiate a request by sending client data to the server 220 at step 202. The server 220 processes the request and returns a DP protected intersection dataset back to the client at step 210. The client 200 may then perform data analysis on the returned intersection dataset at step 204.

In some implementations, before processing the client request, the server 220 may first configure its DP protection parameters, also called bias parameters, to achieve the desired DP protection strength at step 205. The DP protection strength may be referred to as $\varepsilon$, which may be specified by the client 200 or by the server 220 itself. In practical application, $\varepsilon$ may be a positive real number between 0 and 1. A more detailed example of determining the bias parameters based on the DP strength parameter $\varepsilon$ is described in FIG. 3.

After receiving the client data, the server 220 may retrieve the corresponding server data at step 207 to determine the intersection dataset at step 208. This determination may be implemented by various means, such as using hash tables to achieve O(N) computing complexity, or using lists with $O(N^2)$ computing complexity. For instance, the server data may be stored in a hash table, for each data entry in the client data, a hash table lookup with complexity O(1) may be performed. If the lookup returns a match, the matched server data entry will be put into the intersection dataset. This process may continue until all data entries (N) in the client data are iterated, which means the total complexity is O(N).

In some implementations, since the determination of the bias parameters at step 206 and the determination of the intersection dataset at steps 207 and 208 are independent, they may be executed in parallel. In other implementations, the determination of the bias parameters is a one-time configuration, which does not have to be performed for each client request.

Once the server 220 determines the bias parameters and the intersection dataset, it may apply these bias parameters to the intersection dataset to update the intersection dataset at step 209. The application of the bias parameters injects DP protection into the intersection dataset. In some implementations, the bias parameters P may include two pairs of complementary percentages, denoted as $p_{00}$, $p_{01}$, $p_{10}$, and $p_{11}$:

$$P = \begin{pmatrix} p_{00} & p_{01} \\ p_{10} & p_{11} \end{pmatrix}, p_{00}, p_{11} \in [0, 1], \tag{3}$$

where $p_{00}+p_{01}=1$ and $p_{10}+p_{11}=1$, and all four bias parameters are fractions between 0 and 1. The bias parameters may be applied to an individual data entry from the client data to determine whether the individual data entry should be returned to the client. Each of the four bias parameters has a two-digit subscript, where the first digit indicates whether the individual data entry is already in the intersection dataset (e.g., 1 means the data entry is in the intersection, and 0 means otherwise), and the second digit indicates whether to include it in the intersection dataset for return. For example, if $P_{11}=0.3$ and $P_{10}=0.7$, they may be applied to a data entry already in the computed set intersection so that the data entry has a 30% of chance to be left in the intersection dataset and a 70% of chance to be removed from the intersection dataset. As another example, if $P_{01}=0.4$ and $P_{00}=0.6$, they may be applied to a data entry in the client data but not in the intersection dataset, so that the data entry has a 40% of chance to be included in the intersection dataset and a 60% of chance to be left out from the intersection dataset.

In some implementations, the updating of the intersection dataset based on the bias parameters at step 209 may include iterating each data entry in the client data; determining whether the data entry is in the intersection dataset; if the data entry is in the intersection dataset, removing the data entry from the intersection dataset based on a probability determined based on a first bias parameter; and if the data entry is not in the intersection dataset, adding the data entry into the intersection dataset based on a probability determined based on a second bias parameter. The first and second bias parameters may refer to $P_{10}$ and $P_{01}$ in formula (3).

After the data entries in the client data are iterated, the updated intersection dataset is DP protected and may be returned to the client for further processing.

Figures 3, 4:
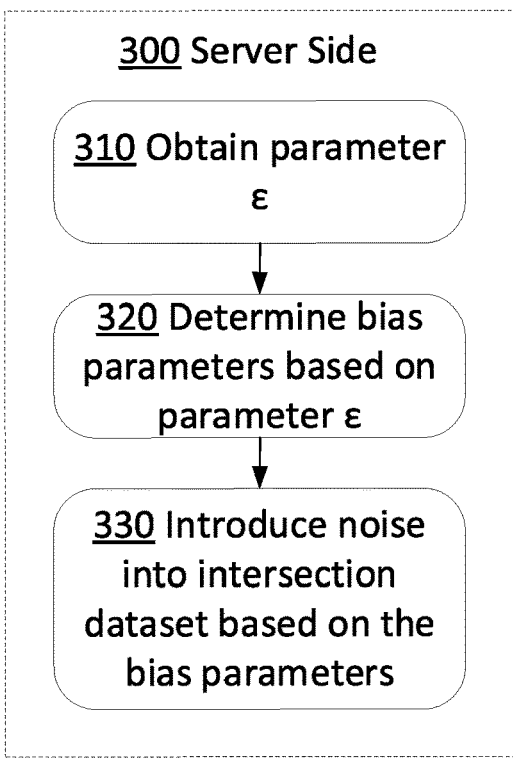
FIG. 3 illustrates an example system diagram for determining bias parameters in accordance with some implementations.
FIG. 4 illustrates an example method for data communication with differentially private set intersections in accordance with some implementations.

FIG. 3 illustrates an example system diagram for determining bias parameters in accordance with some implementations. The determination of the bias parameters described in FIG. 2 may be implemented on a server side 300. The operations in FIG. 3 are for illustrative purposes. Depending on the implementation, the operations may include more, fewer, or alternative steps.

At step 310, a parameter $\varepsilon$ representing DP strength may be obtained by the server for establishing an $\varepsilon$-DP for protecting data returned to clients. Following the denotations in formula (2), $\varepsilon$-DP is satisfied if $$\frac{P(M(C,S) \in F)}{P(M(C,S) \in F)} = \frac{\prod_{i=1}^{|C|} P(x_i = k | f(c_i) = j)}{\prod_{i=1}^{|C|} P(x_i = k | f(c_i') = j)} \le e^\varepsilon, \tag{4}$$

$$\forall\, x_i \in C,\ j \text{ and } k \in [0, 1]$$

According to the neighboring dataset definition of DP, in formula (4), all $c_i = c'_i$ except for one element, denoted as m, then formula (4) may be represented as:

$$\frac{P(X_i = k \mid f(c_m) = j)}{P(X_i = k \mid f(c_m') = j)} \le e^\varepsilon$$

Accordingly, the following inequalities must be held:

$$\mathcal{R} = \begin{cases} p_{11} \le e^\varepsilon(1 - p_{00}) \\ p_{00} \le e^\varepsilon(1 - p_{11}) \\ 1 - p_{00} \le e^\varepsilon p_{11} \\ 1 - p_{11} \le e^\varepsilon p_{00} \\ p_{00}, p_{11} \in [0, 1] \end{cases} \tag{5}$$

When $p_{00}+p_{11}>1$, the following inequalities may be obtained:

$$1 - p_{11} < p_{00} \le e^\varepsilon(1 - p_{11}) < e^\varepsilon p_{00}$$

$$1 - p_{00} < p_{11} \le e^\varepsilon(1 - p_{00}) < e^\varepsilon p_{11}$$

which may be used to simplify formula (5) to:

$$\mathcal{R} = \begin{cases} p_{11} \le e^\varepsilon(1 - p_{00}) \\ p_{00} \le e^\varepsilon(1 - p_{11}) \\ p_{00} + p_{11} > 1 \\ p_{00}, p_{11} \in [0, 1] \end{cases} \tag{6}$$

According to formula (6), $p_{00}$, $p_{01}$, $p_{11}$, and $p_{10}$ may be determined in step 320 as:

$$p_{00} = \frac{e^\varepsilon}{1 + e^\varepsilon};\ p_{01} = 1 - p_{00};\ p_{11} = \frac{e^\varepsilon}{1 + e^\varepsilon};\ p_{10} = 1 - p_{11} \tag{7}$$

With the bias parameters determined by the formula (7), the precision and recall of the returned DP protected intersection dataset may be computed by $$\text{precision}* = \frac{e^\varepsilon |\mathcal{I}|/|C|}{\left(1 - |\mathcal{I}|/|C|\right) + e^\varepsilon |\mathcal{I}|/|C|} \text{ and recall}* = \frac{e^\varepsilon}{1 + e^\varepsilon} \tag{8}$$

Formulas (7) and (8) may be proved by the following analysis. The precision under the DP constraint may be maximized as $$\max_{p_{00}, p_{11}} \frac{p_{11} |\mathcal{I}|}{(1 - p_{00})(|C| - |\mathcal{I}|) + p_{11} |\mathcal{I}|} \tag{9}$$

$$\text{s.t.} \qquad p_{00}, p_{11} \in \mathcal{R}',$$

which is equivalent to $$\max_{p_{00}, p_{11}} \frac{p_{11} |\mathcal{I}|}{(1 - p_{00})(|C| - |\mathcal{I}|)} \tag{10}$$

$$\text{s.t.} \qquad p_{00}, p_{11} \in \mathcal{R}',$$

with an assumption that $|C| - |\mathcal{I}| > 0$. Note that the numerator and denominator of formula (10) are monotonic increasing and decreasing functions of $p_{11}$ and $p_{00}$, respectively. If the numerator and denominator reach the maximum and minimum points at the same time, the objective function achieves the maximum. Hence, the optimal $p_{11}$ and $p_{00}$ are set to be the corresponding boundary points in R', i.e., $p_{11}=e^\varepsilon(1-p_{00})$ and $p_{00}=e^\varepsilon(1-p_{11})$. Solving these two equations gives the optimal values of $p_{11}$ and $p_{00}$ that maximize the precision, $$p_{00} = \frac{e^\varepsilon}{1 + e^\varepsilon} \text{ and } p_{11} = \frac{e^\varepsilon}{1 + e^\varepsilon},$$

which are presented in formula (7).

Substituting the above results back to the precision expression in formula (9), the optimal precision may be obtained as $$precision* = \frac{e^\epsilon |\mathcal{I}|/|C|}{\left(1 - |\mathcal{I}|/|C|\right) + e^\epsilon |\mathcal{I}|/|C|},$$

and the optimal recall is obtained by maximizing the definition:

$$recall = \frac{p_{11}|\mathcal{I}|}{(1 - p_{11})|\mathcal{I}| + p_{11}|\mathcal{I}|} = p_{11}$$

By using $p_{11}$ from formula (7), the optimal recall may be represented as:

$$recall* = \frac{e^\epsilon}{1 + e^\epsilon}$$

which proves the representations in formula (8).

Subsequently, at step 330, the determined bias parameters may be applied to each data entry in the client data to inject noise into the intersection dataset for $\epsilon$-DP protection. FIG. 4 illustrates an example method for applying the bias parameters.

The following performance evaluation demonstrates the technical advantages and performance improvement by using the above-described solution to determine set intersections with $\epsilon$-DP protection. Assuming $\epsilon=4$ is given, based on formula (8), the recall is $$\frac{e^4}{1 + e^4} = 0.982.$$

For an experimental client dataset $|C|=10^8$ and an experimental intersection dataset $|I|=0.5*10^8$, based on formula (8), the precision is 0.982.

Without loss of generality, assuming the data size ratio between the intersection dataset and the client dataset is $r \triangleq |I|/|C|$, the optimal precision is given by:

$$precision* = \frac{re^\epsilon}{(1 - r) + re^\epsilon} = \frac{e^\epsilon}{(1/r - 1) + e^\epsilon}$$

which indicates that the more overlapping data exist between the client data and the server data, the better precision may be achieved by updating the intersection dataset based on the bias parameters while satisfying the desired DP protection strength.

In comparison, the above performance numbers are compared against those offered by an existing solution proposed by Kacsma et al. For example, the randomized response mechanism in Kacsma requires tossing two coins (with head probability p and q) for each data entry. If the first coin is head, the data entry will not be touched. If the first coin is tail, the second coin is tossed. If the second coin is head, then the data entry is placed into the intersection. On the other hand, if the second coin is tail, the data entry will not be included in the intersection. Therefore, according to formula (1):

$$e^\epsilon = \frac{p + (1 - p)q}{(1 - p)q} \cdot \frac{p + (1 - p)(1 - q)}{(1 - p)(1 - q)}$$

Thus, in Kacsma, let $\epsilon=4$ and $p=0.5$, q may be determined as 0.981, and the corresponding recall is 0.981 and the precision is 0.662. As such, the precision of Kacsma is much lower than the 0.982 precision obtained by the above-described solution.

FIG. 4 illustrates an example method 400 for data communication with differentially private set intersections in accordance with some implementations. The method 400 may correspond to the step 208 in the system diagram of FIG. 2 and may be implemented by a server. The method 400 may be executed after the bias parameters and the intersection dataset (between client data and server data) are determined by the server. The bias parameters may be determined, for example, based on the formula (7).

In some implementations, each data entry in the client data may be iterated. For each data entry, the server may first determine whether it is in the intersection dataset. If yes, the server may construct and execute a random number generator to determine whether to leave it in the intersection or remove it from the intersection. The random number generator may be constructed based on one of the bias parameters, such as $p_{11}$. For example, the random number generator may have a probability of $p_{11}$ to generate value 1 (e.g., equivalent to tossing a coin and getting heads). When being executed, if the random number generator generates value 1, the current data entry will be removed from the intersection dataset. Otherwise, the current data entry will be left in the intersection dataset.

Similarly, if the current data entry is not in the intersection dataset, another random number generator may determine whether to add the current data entry into the intersection dataset. This random number generator may be determined based on another bias parameter, such as $p_{01}$. For example, this random number generator has a probability of $p_{01}$ to generate value 1 (e.g., equivalent to tossing a coin and getting heads). When being executed, if the random number generator generates value 1, the current data entry will be added to the intersection dataset. Otherwise, the current data entry will be left out.

The method 400 may achieve that the data returned from the server to the client is DP protected. However, the computation of the intersection dataset may expose the client data to the server. It means, the privacy of the server data is protected against the client, but the privacy of the client data is not protected against the server. In some implementations, both the client data and the server data may be homomorphically encrypted using homomorphic commitment mechanisms, which further enhances the data privacy protection. Homomorphic encryption is a form of encryption that permits users to compute its encrypted data without first decrypting it. These resulting computations are left in an encrypted form which, when decrypted, result in an identical output to that produced had the operations been performed on the unencrypted data. With homomorphic encryption, the server may determine an encrypted intersection dataset based on encrypted client data and encrypted server data, and update the encrypted intersection dataset based on the bias parameters. This way, the client data is encrypted and thus protected against the server, and the updated encrypted intersection dataset returned from the server is also DP protected against the client.

FIG. 5 illustrates an example method 500 for data communication with differentially private set intersections in accordance with some implementations. The method 500 may be performed by a device, apparatus, or system for data communication. The method 500 may be performed by one or more modules/components of the environment or system illustrated by FIGS. 1-4, such as the server 120 in FIG. 1 or the server 220 in FIG. 2, other computing systems/devices. The operations of the method 500 presented below are intended to be illustrative. Depending on the implementation, the method 500 may include additional, fewer, or alternative steps performed in various orders or parallel.

Operation 510 includes determining, by a server device, a plurality of bias parameters based on a parameter ε for establishing ε-differential privacy (ε-DP) data protection. In some implementations, the determining the plurality of bias parameters based on the parameter ε comprises: determining a first bias parameter based on the parameter ε; and determining a second bias parameter as a complement of the first bias parameter. In some implementations, the determining the first bias parameter based on the parameter ε comprises: determining the first bias parameter based on the parameter ε and Euler's number e. In some implementations, the parameter ε is a positive real number.

Operation 520 includes receiving, by the server device, client data from a client device. In some implementations, the client data and the server data are homomorphically encrypted.

Operation 530 includes determining, by the server device, an intersection dataset based on the client data from the client device and server data of the server device. In some implementations, the server device is associated with an e-commerce platform, and the client device provides online ad services.

Operation 540 includes updating, by the server device, the intersection dataset based on the client data and the plurality of bias parameters. In some implementations, the plurality of bias parameters comprises a first bias parameter, and the updating the intersection dataset based on the client data and the plurality of bias parameters comprises: iterating each data entry in the client data; determining whether the data entry is in the intersection dataset; if the data entry is in the intersection dataset, removing, with a probability determined based on the first bias parameter, the data entry from the intersection dataset. In some implementations, the removing the data entry from the intersection dataset with a probability determined based on the first bias parameter comprises: constructing a random number generator that yields a first value with a first probability equal to the first bias parameter and a second value with a complement probability of the first probability; executing the random number generator to obtain an output; if the output is the first value, removing the data entry from the intersection dataset; and if the output is the second value, leaving the data entry in the intersection dataset. In some implementations, the plurality of bias parameters further comprise a second bias parameter that is a complement of the first bias parameter, and if the data entry is not in the intersection dataset, adding, with a probability determined based on the second bias parameter, the data entry into the intersection dataset. In some implementations, the adding the data entry into the intersection dataset based on a probability determined based on the first bias parameter comprises: constructing a random number generator that yields a first value with a first probability equal to the second bias parameter and a second value with a complement probability of the first probability; executing the random number generator to obtain an output;

if the output is the first value, adding the data entry into the intersection dataset; and if the output is the second value, removing the data entry from the intersection dataset.

Operation 550 includes returning, by the server device to the client device, the updated intersection data offering ε-DP data protection.

Figure 6:
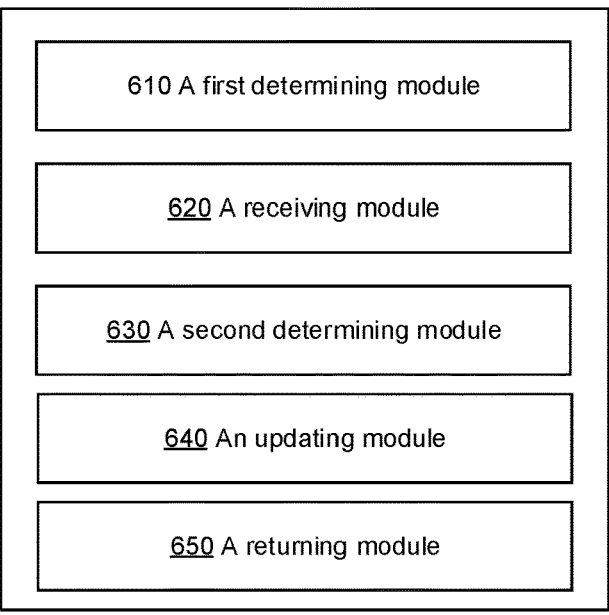
FIG. 6 illustrates a block diagram of a computer system for data communication with differentially private set intersections in accordance with some implementations.

FIG. 6 illustrates a block diagram of a computer system 600 for data communication with differentially private set intersections in accordance with some implementations. The computer system 600 may be an example of an implementation of one or more modules in the computing system in FIGS. 1-5, or one or more other components illustrated in FIGS. 1-5. The method 500 in FIG. 5 may be implemented by the computer system 600. The computer system 600 may comprise one or more processors and one or more non-transitory computer-readable storage media (e.g., one or more memories) coupled to the one or more processors and configured with instructions executable by the one or more processors to cause the system or device (e.g., the processor) to perform the above-described method, e.g., the method 500. The computer system 600 may comprise various units/modules corresponding to the instructions (e.g., software instructions).

In some implementations, the computer system 600 may be referred to as an apparatus for data communication with differentially private set intersections in a system with a client-server architecture. The apparatus may comprise a first determining module 610, a receiving module 620, a second determining module 630, an updating module 640, and a returning module 650. In some implementations, the first determining module 610 is configured to determine a plurality of bias parameters based on a parameter ε for establishing ε-differential privacy (ε-DP) data protection. The receiving module 620 is configured to receive client data from a client device. The second determining module 630 is configured to determine an intersection dataset based on the client data from the client device and server data of the server device. The updating module 640 is configured to update the intersection dataset based on the client data and the plurality of bias parameters. The returning module 650 is configured to return the updated intersection data offering ε-DP data protection to the client device.

The techniques described herein may be implemented by one or more special-purpose computing devices. The special-purpose computing devices may be desktop computer systems, server computer systems, portable computer systems, handheld devices, networking devices or any other device or combination of devices that incorporate hardwired and/or program logic to implement the techniques. The special-purpose computing devices may be implemented as personal computers, laptops, cellular phones, camera phones, smart phones, personal digital assistants, media players, navigation devices, email devices, game consoles, tablet computers, wearable devices, or a combination thereof. Computing device(s) may be generally controlled and coordinated by operating system software. Conventional operating systems control and schedule computer processes for execution, perform memory management, provide file system, networking, I/O services, and provide a user interface functionality, such as a graphical user interface ("GUI"), among other things. The various systems, apparatuses, storage media, modules, and units described herein may be implemented in the special-purpose computing devices, or one or more computing chips of the one or more special-purpose computing devices. In some implementations, the instructions described herein may be implemented in a virtual machine on the special-purpose computing device. When executed, the instructions may cause the special-purpose computing device to perform various methods described herein. The virtual machine may include a software, hardware, or a combination thereof.

Figure 7:
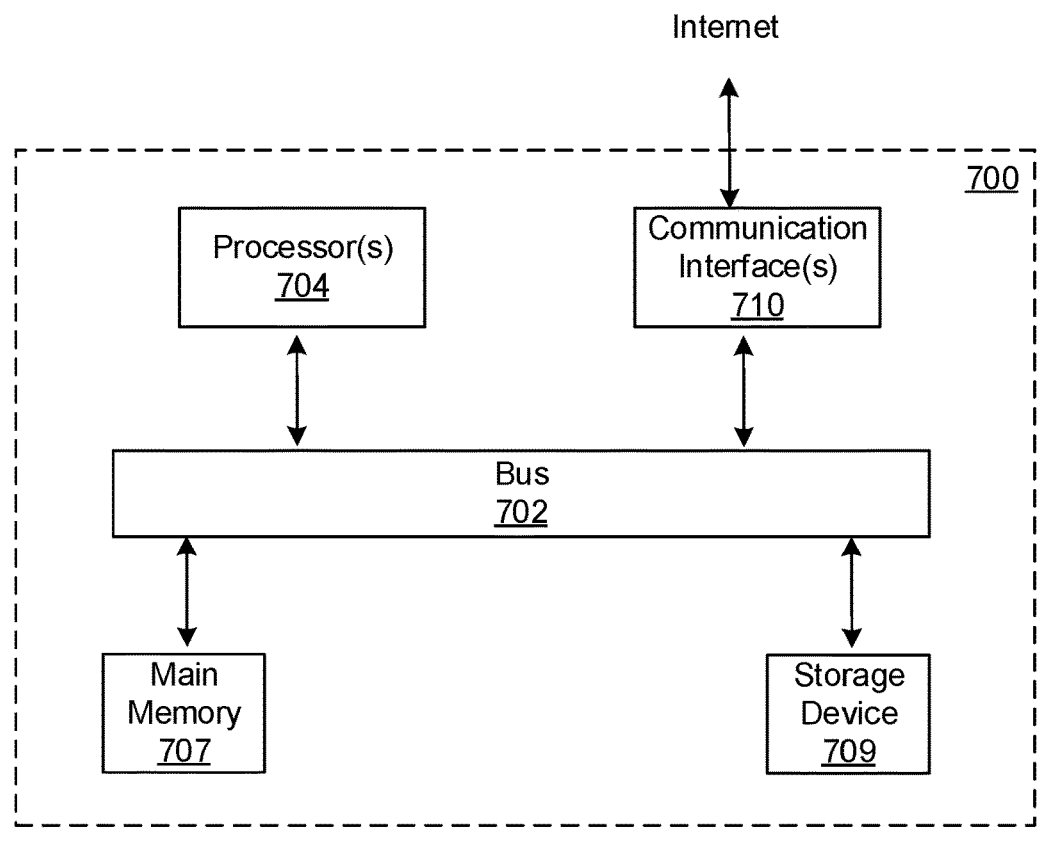
FIG. 7 illustrates an example computing device in which any of the implementations described herein may be implemented.

FIG. 7 illustrates an example computing device in which any of the implementations described herein may be implemented. The computing device may be used to implement one or more components of the systems and the methods shown in FIGS. 1-6 The computing device 700 may comprise a bus 702 or other communication mechanism for communicating information and one or more hardware processors 704 coupled with bus 702 for processing information. Hardware processor(s) 704 may be, for example, one or more general purpose microprocessors.

The computing device 700 may also include a main memory 707, such as a random-access memory (RAM), cache and/or other dynamic storage devices, coupled to bus 702 for storing information and instructions to be executed by processor(s) 704. Main memory 707 also may be used for storing temporary variables or other intermediate information during execution of instructions to be executed by processor(s) 704. Such instructions, when stored in storage media accessible to processor(s) 704, may render computing device 700 into a special-purpose machine that is customized to perform the operations specified in the instructions. Main memory 707 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, or networked versions of the same.

The computing device 700 may implement the techniques described herein using customized hard-wired logic, one or more ASICs or FPGAs, firmware and/or program logic which in combination with the computing device may cause or program computing device 700 to be a special-purpose machine. According to one implementation, the techniques herein are performed by computing device 700 in response to processor(s) 704 executing one or more sequences of one or more instructions contained in main memory 707. Such instructions may be read into main memory 707 from another storage medium, such as storage device 709. Execution of the sequences of instructions contained in main memory 707 may cause processor(s) 704 to perform the process steps described herein. For example, the processes/methods disclosed herein may be implemented by computer program instructions stored in main memory 707. When these instructions are executed by processor(s) 704, they may perform the steps as shown in corresponding figures and described above. In alternative implementations, hard-wired circuitry may be used in place of or in combination with software instructions.

The computing device 700 also includes a communication interface 710 coupled to bus 702. Communication interface 710 may provide a two-way data communication coupling to one or more network links that are connected to one or more networks. As another example, communication interface 710 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example implementations, the processors or processor-implemented engines may be located in a single geographic location (e.g., within a home environment, an office environment, or a server farm). In other example implementations, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

When the functions disclosed herein are implemented in the form of software functional units and sold or used as independent products, they can be stored in a processor executable non-volatile computer readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the implementations of the present application. The storage medium may comprise a flash drive, a portable hard drive, ROM, RAM, a magnetic disk, an optical disc, another medium operable to store program code, or any combination thereof.

Particular implementations further provide a system comprising a processor and a non-transitory computer-readable storage medium storing instructions executable by the processor to cause the system to perform operations corresponding to steps in any method of the implementations disclosed above. Particular implementations further provide a non-transitory computer-readable storage medium configured with instructions executable by one or more processors to cause the one or more processors to perform operations corresponding to steps in any method of the implementations disclosed above.

Implementations disclosed herein may be implemented through a cloud platform, a server or a server group (hereinafter collectively the "service system") that interacts with a client. The client may be a terminal device, or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process operations may be omitted in some implementations. The methods and processes described herein are also not limited to any particular sequence, and the operations or states relating thereto can be performed in other sequences that are appropriate. For example, described operations or states may be performed in an order other than that specifically disclosed, or multiple operations or states may be combined in a single operation or state. The example operations or states may be performed in serial, in parallel, or in some other manner Operations or states may be added to or removed from the disclosed example implementations. The example systems and components described herein may be configured differently than described. For example, elements may be added to, removed from, or rearranged compared to the disclosed example implementations.

The various operations of example methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some implementations, a machine learning algorithm may not explicitly program computers to perform a function but can learn from training data to make a prediction model that performs the function.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example implementations, the processors or processor-implemented engines may be located in a single geographic location (e.g., within a home environment, an office environment, or a server farm). In other example implementations, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example implementations, various modifications and changes may be made to these implementations without departing from the broader scope of implementations of the present disclosure. Such implementations of the subject matter may be referred to herein, individually or collectively, by the term "invention" merely for convenience and without intending to voluntarily limit the scope of this application to any single disclosure or concept if more than one is, in fact, disclosed.

The implementations illustrated herein are described in sufficient detail to enable those skilled in the art to practice the teachings disclosed. Other implementations may be used and derived therefrom, such that structural and logical substitutions and changes may be made without departing from the scope of this disclosure. The Detailed Description, therefore, is not to be taken in a limiting sense, and the scope of various implementations is defined only by the appended claims, along with the full range of equivalents to which such claims are entitled.

Any process descriptions, elements, or operations in the flow diagrams described herein and/or depicted in the attached figures should be understood as potentially representing modules, segments, or portions of code which include one or more executable instructions for implementing specific logical functions or steps in the process. Alternate implementations are included within the scope of the implementations described herein in which elements or functions may be deleted, executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various implementations of the present disclosure. In general, structures and functionality presented as separate resources in the example configurations may be implemented as a combined structure or resource Similarly, structures and functionality presented as a single resource may be implemented as separate resources. These and other variations, modifications, additions, and improvements fall within a scope of implementations of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain implementations include, while other implementations do not include, certain features, elements and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The invention claimed is:

1. A computer-implemented method for data communication, comprising:

determining, by a first device, a plurality of bias parameters based on a parameter for establishing a differential privacy (DP) data protection;

determining, by the first device, an intersection dataset based on client data from a second device and server data from the first device;

updating, by the first device, the intersection dataset based on the client data and the plurality of bias parameters, the updating the intersection database including one or more of adding a data entry into the intersection dataset or removing a data entry from the intersection dataset based on a probability determined based on a bias parameter of the plurality of bias parameters after determining whether a data entry is not in the intersection dataset or whether a data entry is in the intersection dataset respectively; and returning, by the first device, the updated intersection data having the DP data protection to the second device.

2. The method of claim 1, wherein the determining the plurality of bias parameters based on the parameter comprises:

determining a first bias parameter of the plurality of bias parameters based on the parameter; and determining a second bias parameter of the plurality of bias parameters as a complement of the first bias parameter.

3. The method of claim 2, wherein the updating the intersection dataset based on the client data and the plurality of bias parameters includes removing a data entry from the intersection dataset, the removing comprises:

in response to determining the data entry is in the intersection dataset, removing, with a probability determined based on the first bias parameter, the data entry from the intersection dataset.

4. The method of claim 3, wherein the removing the data entry from the intersection dataset comprises:

constructing a random number generator that yields a first value with a first probability equal to the first bias parameter and a second value with a complement probability of the first probability;

executing the random number generator to obtain an output;

in response to the output is the first value, removing the data entry from the intersection dataset; and in response to the output is the second value, leaving the data entry in the intersection dataset.

5. The method of claim 2, wherein the updating the intersection dataset based on the client data and the plurality of bias parameters includes adding a data entry into the intersection dataset, the adding comprises:

in response to determining the data entry is not in the intersection dataset, adding, with a probability determined based on the second bias parameter, the data entry into the intersection dataset.

6. The method of claim 5, wherein the adding the data entry into the intersection dataset comprises:

constructing a random number generator that yields a first value with a first probability equal to the second bias parameter and a second value with a complement probability of the first probability;

executing the random number generator to obtain an output;

in response to the output is the first value, adding the data entry into the intersection dataset; and in response to the output is the second value, removing the data entry from the intersection dataset.

7. The method of claim 2, wherein the determining the first bias parameter based on the parameter comprises:

determining the first bias parameter based on the parameter and Euler's number e.

8. The method of claim 1, wherein the parameter is a positive real number.

9. The method of claim 1, wherein the client data and the server data are homomorphically encrypted.

10. The method of claim 1, wherein the first device is a server, and the second device is a client device.

11. A computer system of a server device for data communication, the computer system comprising one or more processors and one or more non-transitory computer-readable memories coupled to the one or more processors and configured with instructions executable by the one or more processors to, individually or collectively, cause the system to perform operations comprising:

determining a plurality of bias parameters based on a parameter for establishing a differential privacy (DP) data protection;

determining an intersection dataset based on client data from a client device and server data from the server device;

updating the intersection dataset based on the client data and the plurality of bias parameters, the updating the intersection database including one or more of adding a data entry into the intersection dataset or removing a data entry from the intersection dataset based on a probability determined based on a bias parameter of the plurality of bias parameters after determining whether a data entry is not in the intersection dataset or whether a data entry is in the intersection dataset respectively; and returning the updated intersection data having the DP data protection to the client device.

12. The computer system of claim 11, wherein the determining the plurality of bias parameters based on the parameter comprises:

determining a first bias parameter of the plurality of bias parameters based on the parameter; and determining a second bias parameter of the plurality of bias parameters as a complement of the first bias parameter.

13. The computer system of claim 12, wherein the updating the intersection dataset based on the client data and the plurality of bias parameters includes removing a data entry from the intersection dataset, the removing comprises:

in response to determining the data entry is in the intersection dataset, removing, with a probability determined based on the first bias parameter, the data entry from the intersection dataset.

14. The computer system of claim 13, wherein the removing the data entry from the intersection dataset comprises:

constructing a random number generator that yields a first value with a first probability equal to the first bias parameter and a second value with a complement probability of the first probability;

executing the random number generator to obtain an output;

in response to the output is the first value, removing the data entry from the intersection dataset; and in response to the output is the second value, leaving the data entry in the intersection dataset.

15. The computer system of claim 12, wherein the updating the intersection dataset based on the client data and the plurality of bias parameters includes adding a data entry into the intersection dataset, the adding comprises:

in response to determining the data entry is not in the intersection dataset, adding, with a probability determined based on the second bias parameter, the data entry into the intersection dataset.

16. A non-transitory computer-readable storage medium of a server device for data communication, configured with instructions executable by one or more processors to cause the one or more processors to, individually or collectively, perform operations comprising:

determining a plurality of bias parameters based on a parameter for establishing a differential privacy (DP) data protection;

determining an intersection dataset based on client data from a client device and server data from the server device;

updating the intersection dataset based on the client data and the plurality of bias parameters, the updating the intersection database including one or more of adding a data entry into the intersection dataset or removing a data entry from the intersection dataset based on a probability determined based on a bias parameter of the plurality of bias parameters after determining whether a data entry is not in the intersection dataset or whether a data entry is in the intersection dataset respectively; and returning the updated intersection data having the DP data protection to the client device.

17. The non-transitory computer-readable storage medium of claim 16, wherein the determining the plurality of bias parameters based on the parameter comprises:

determining a first bias parameter of the plurality of bias parameters based on the parameter; and determining a second bias parameter of the plurality of bias parameters as a complement of the first bias parameter.

18. The non-transitory computer-readable storage medium of claim 17, wherein the updating the intersection dataset based on the client data and the plurality of bias parameters includes removing a data entry from the intersection dataset, the removing comprises:

in response to determining the data entry is in the intersection dataset, removing, with a probability determined based on the first bias parameter, the data entry from the intersection dataset.

19. The non-transitory computer-readable storage medium of claim 18, wherein the removing the data entry from the intersection dataset comprises:

constructing a random number generator that yields a first value with a first probability equal to the first bias parameter and a second value with a complement probability of the first probability;

executing the random number generator to obtain an output;

in response to the output is the first value, removing the data entry from the intersection dataset; and in response to the output is the second value, leaving the data entry in the intersection dataset.

20. The non-transitory computer-readable storage medium of claim 17, wherein the second bias parameter is a complement of the first bias parameter, and the updating the intersection dataset based on the client data and the plurality of bias parameters includes adding a data entry into the intersection dataset, the adding comprises:

in response to determining the data entry is not in the intersection dataset, adding, with a probability determined based on the second bias parameter, the data entry into the intersection dataset.

* * * * *